No. 655,415. Patented Aug. 7, 1900.
A. C. PESSANO.
SHIFTER FOR CLUTCHES, &c.
(Application filed Mar. 19, 1900.)
(No Model.)
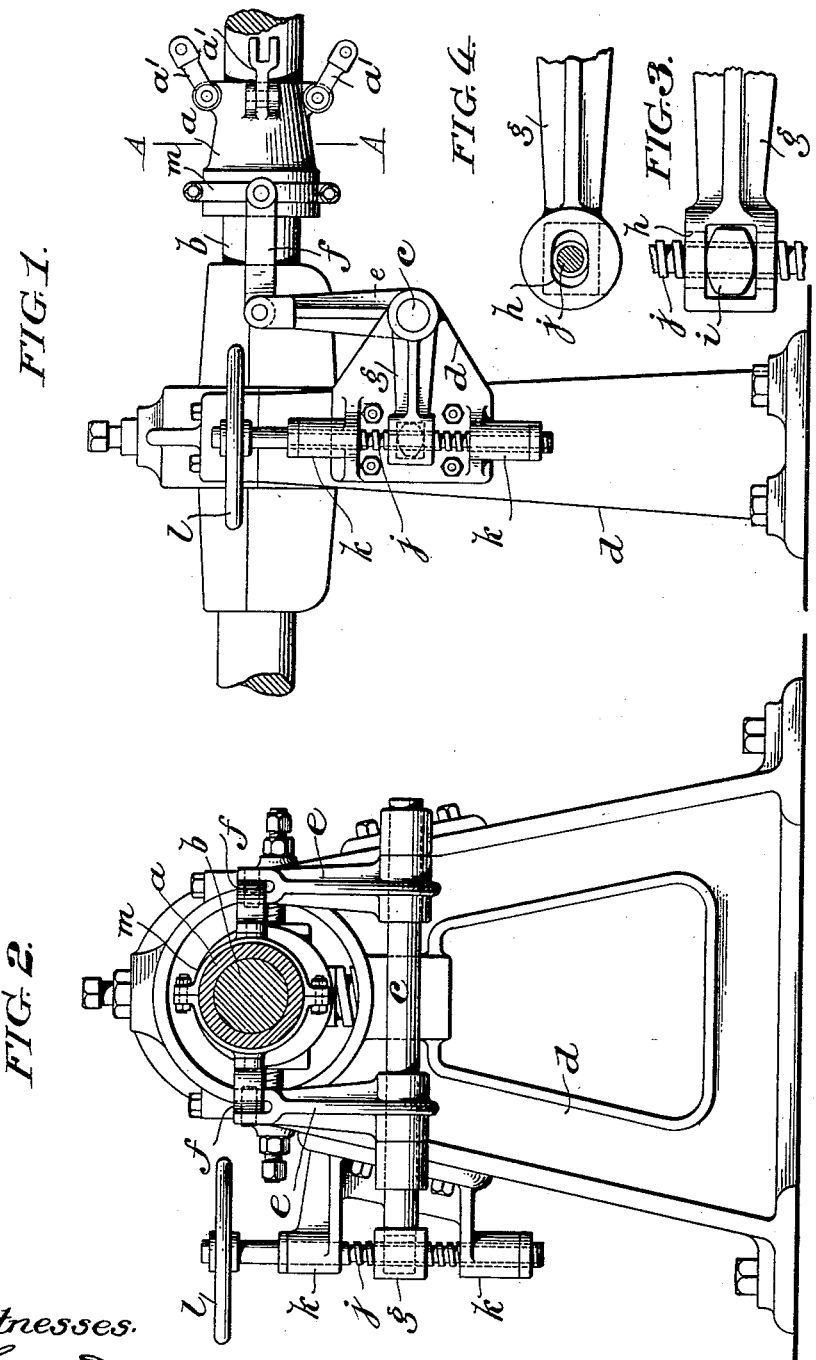
Witnesses.
Inventor:
Antonio C. Pessano
By his atty.

ary on the shaft $b$ to operate the clutch or other device connected with said sleeve.

UNITED STATES PATENT OFFICE.

ANTONIO C. PESSANO, OF PHILADELPHIA, PENNSYLVANIA, ASSIGNOR TO THE GEORGE V. CRESSON COMPANY, OF PENNSYLVANIA.

SHIFTER FOR CLUTCHES, &c.

SPECIFICATION forming part of Letters Patent No. 655,415, dated August 7, 1900.

Application filed March 19, 1900. Serial No. 9,299. (No model.)

*To all whom it may concern:*

Be it known that I, ANTONIO C. PESSANO, of the city and county of Philadelphia, in the State of Pennsylvania, have invented an Improvement in Shifters for Clutches, &c., of which the following is a specification.

My invention relates to shifters for operating clutches, &c.; and it consists of the improvements which are fully set forth in the following specification and are shown in the accompanying drawings.

It is the object of my invention to provide a shifting device of simple and efficient character where small range of movement but great power are required—such, for example, as are used in clutch-shifters for operating shafting.

My invention will be better understood by reference to the accompanying drawings.

Figure 1 is a side elevation of a shifter for clutches, &c., embodying my invention. Fig. 2 is a transverse vertical sectional view of the same on line A A of Fig. 1. Fig. 3 is a side elevation of part of the operating-screw and shifting-lever looking from the inner side, and Fig. 4 is a plan view of the same.

$a$ is the part to be shifted, which in this case is shown as a sleeve mounted on a shaft $h$ and provided with links $a'$, which may be connected with a clutch member or other device to be operated, the particular character of which is not material to the invention.

$c$ is a rock-shaft journaled in a standard or frame $d$ and having arms $e$ $e$, connected by links $f$ through the collar or strap $m$ with the sleeve or part $a$ and provided with an operating arm or lever $g$, having in its outer end a recess $h$, in which is located an internally-threaded nut $i$, having its upper and lower faces rounded, as shown. (See Fig. 3.)

$j$ is a screw extending through the threaded nut $i$ and having its shank journaled in suitable bearings $k$ $k$, carried by the main frame.

The shaft $c$ and arms $e$ $g$ constitute a bell-crank lever having one end operatively connected with the operating-screw $j$ and the other end connected with the sleeve or part $a$ by the links $f$, so that by turning the screw $j$, as by the hand-wheel $l$, the bell-crank lever may be rocked and the part $a$ shifted longitudinally on the shaft $b$ to operate the clutch or other device connected with said sleeve.

In my preferred construction the end of the lever $g$ is recessed from the inner side only to form the socket $h$ for the nut $i$.

As shown, the shaft $c$ of the bell-crank lever is journaled transversely to the part $a$ to be shifted, and the arms $e$ $e$ extend up on each side and are connected through the links $f$ and collar $m$ with the opposite sides of the part $a$. The arm $g$ extends rearwardly and is operated by the upright screw $j$, which is also journaled in the main frame or standard. This constitutes an arrangement of parts which is extremely easy to operate and in which with the small range of movement required a great amount of power may be obtained.

What I claim as new, and desire to secure by Letters Patent, is as follows:

1. In a shifting device for clutches, &c., the combination with the part to be shifted, of a fixed standard or bearing, a bell-crank lever journaled in a stationary bearing on said standard and adapted to be operatively connected at one end with the part of the clutch to be shifted, and an operating-screw arranged transversely to the axis of the bearing of the bell-crank and operatively connected by an adjustable nut with the other end of said bell-crank lever, whereby the rotation of said screw will cause said lever to be rocked and the part to be shifted operated.

2. In a shifting device for clutches, &c., the combination with the part of the clutch to be shifted, with a fixed standard or bearing, a bell-crank lever formed of the arms $e$, $e$, $g$ secured to a transverse shaft $c$, links $f$ between the arms $e$ of the bell-crank lever and the part to be shifted, fixed bearings $d$ for the transverse shaft $c$, an internally-threaded nut $i$ adjustably carried by the arm $g$ of the said bell-crank lever, the vertical operating-screw $j$ extending through said nut, and bearings for said screw to hold it against longitudinal movement.

3. In a shifting device for clutches, &c., the combination with the part to be shifted of a main frame or standard, a bell-crank lever consisting of a shaft $c$ journaled in said main frame or standard transversely to the part to be shifted, of arms *e, e*, carried by said shaft and located one on each side of said part to be shifted and operatively connected therewith, and of an arm *g* recessed at its outer end, an internally-threaded nut *i* located in said recess, and an upright operating-screw *j* having its shank journaled in said main frame or standard, and engaging said nut *i*.

4. In a shifting device for clutches, an upright standard having three fixed bearings arranged at different angles to each other, combined with a main shaft journaled in one of said bearings, a transverse bell-crank shaft journaled in another of said bearings at right angles to said main shaft, an upright screw-shaft carried by the remaining bearings and transversely to both the main shaft and the bell-crank shaft, arms carried by the bell-crank shaft adapted to operate the movable part of the clutch, and an arm also secured to the bell-crank shaft and having an adjustable screw-threaded connection with the screw-shaft.

5. In a shifting device for clutches, &c., an upright standard having at the top a main bearing for the main shaft, in combination with a bearing structure carried by the main standard and provided with transverse and upright bearings, a bell-crank structure journaled in the transverse bearing and having its free end adapted for connection with the movable part of the clutch, a loose nut carried by the other arm of the bell-crank, and an adjusting-screw working through the nut and held in the upright bearings against longitudinal movement.

6. In a shifting device for clutches, &c., the combination of a main standard provided with a main bearing and a transverse bearing at right angles to said main bearing and having a relatively-fixed relation thereto, a transverse shaft journaled in said transverse bearings and provided with two upright arms extending upon each side of the main bearing for operating the movable part of the clutch and also having a power-arm to which the power is applied for rocking the said shaft, and an adjusting-screw connected to the power-arm of the bell-crank lever and to the main standard for adjusting the transverse shaft.

In testimony of which invention I hereunto set my hand.

ANTONIO C. PESSANO.

Witnesses:
J. W. KENWORTHY,
ERNEST HOWARD HUNTER.